UNITED STATES PATENT OFFICE.

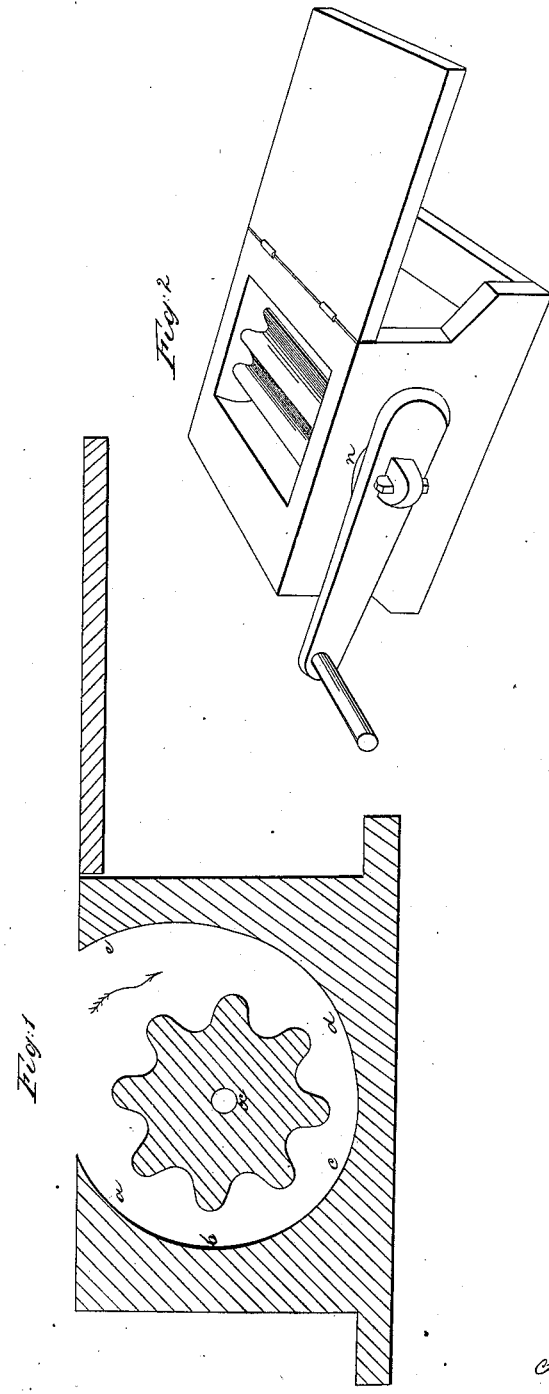

SOCRATES M. RIDGAWAY, OF ST. MICHAELS, MARYLAND.

MACHINE FOR MAKING AND KNEADING DOUGH.

Specification of Letters Patent No. 15,254, dated July 1, 1856.

*To all whom it may concern:*

Be it known that I, SOCRATES M. RIDGAWAY, of St. Michaels, Talbot county, in the State of Maryland, have invented a new and Improved Mode of Mixing and Kneading Dough for Bread; and I do hereby declare that the following is a full description of the same, reference being had to the accompanying drawing and the letters of reference marked thereon.

My invention consists in the combination of a revolving fluted roller with a kneading trough, the bottom or lower portion of which is so shaped as to cause the materials placed within it to slide downward and under the moving roller, by the operation of which the process of mixing and kneading is effected.

To enable others to make and use my invention I will describe its construction and method of operating.

The kneading trough, of wood or metal as the case may be, can be made of any desirable size, and should be proportioned to the amount of work required to be performed by it. The inside shape of the trough is shown by the line marked $a$, $b$, $c$, $d$, $e$, in Fig. 1, of the annexed drawing, the portion $b$, $c$, $d$, forming a regular concave, within and near to which revolves the fluted roller marked $x$, in the same figure. The portion of the line showing the inside shape of the trough marked $d$, $e$, is carried upward and from the roller $x$, thereby making a sufficient space for receiving the ingredients to be mixed and kneaded. The sides of the trough are made so as to receive, and sustain at the proper distance from its concave bottom, the journals of the roller, as shown at the point $n$, in the perspective representation of the apparatus, in working order, marked Fig. 2 and hereto annexed.

The mode of operating my invention is to place the materials to be mixed and kneaded in the trough on the side of the roller having the largest space and then to turn the roller by hand or other power, from right to left until the mixing and kneading be effected. The roller by its irregular surface operates on the materials subjected to its motion so as to roll and crush them together within the concave portion of the trough, which rolling and crushing is repeated with each revolution of the roller until the process of mixing and kneading be completed.

Now what I claim as my invention, and desire to secure by Letters Patent, is—

The combination of the fluted roller with the kneading trough shaped and combined so as to operate as hereinbefore substantially described.

SOCRATES M. RIDGAWAY.

Witnesses:
    MORRIS COCHRAN,
    HENRY STOCKBRIDGE.